March 29, 1966    MAX GUSTAV HANDSCHIN    3,243,806
METHOD FOR ACTIVATING A CAMERA OF A RADAR SPEED
MEASURING APPARATUS FOR ROAD VEHICLES
Filed July 24, 1964
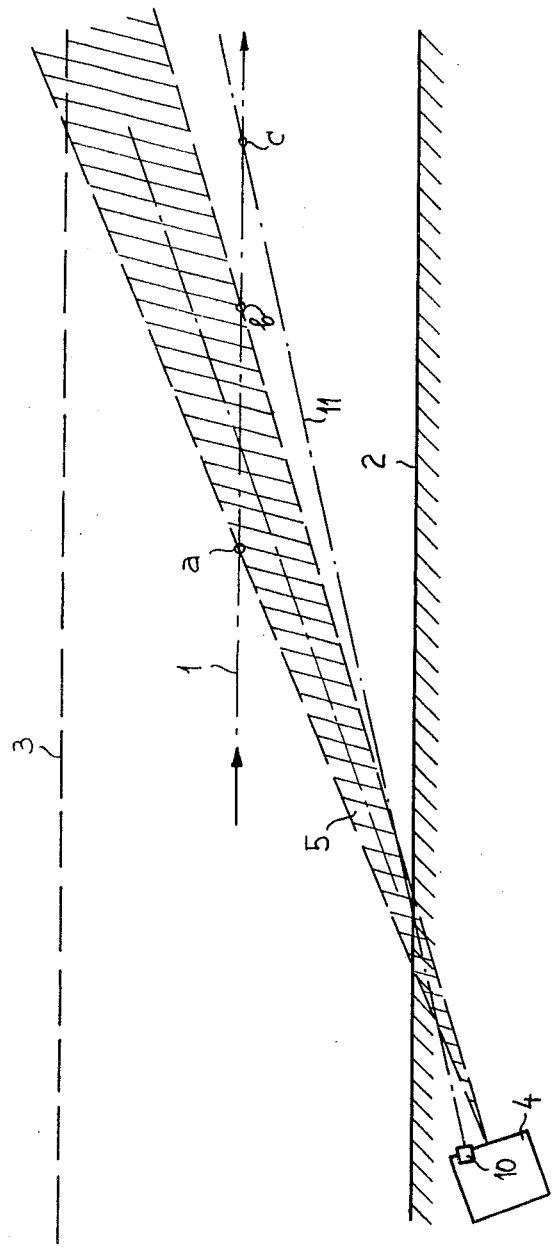
INVENTOR
Max Gustav Handschin
BY Werner W. Kleeman
His Attorney

United States Patent Office 3,243,806
Patented Mar. 29, 1966

3,243,806
METHOD FOR ACTIVATING A CAMERA OF A RADAR SPEED MEASURING APPARATUS FOR ROAD VEHICLES
Max Gustav Handschin, Kusnacht, Zurich, Switzerland, assignor to Multanova A.G., Kusnacht, Zurich, Switzerland, a corporation of Switzerland
Filed July 24, 1963, Ser. No. 297,406
Claims priority, application Switzerland, July 26, 1962, 8,984/62
3 Claims. (Cl. 343—8)

The present invention has reference to an improved method for activating or tripping a camera of a radar speed measuring installation for checking the speed of moving objects, particularly road vehicles.

In applicant's commonly assigned, copending United States patent application Serial No. 188,768, filed April 19, 1962, for "Apparatus for Measuring and Recording the Speed of Motor Vehicles, Especially Road Vehicles," now United States Patent No. 3,137,538, granted June 16, 1964 there is depicted and described a radar installation for measuring and recording the speed of road vehicles. According to the teachings therein the measured speed value is reproduced upon an indicating instrument, and further, is graphically recorded upon a data sheet provided with a preprinted scale, whereby precautions are undertaken to ensure that a recording operation only than takes place when the vehicle has exceeded a given, presettable critical speed. In the aforementioned patent there has also been described that for the purpose of supplementary documentation a photographic camera can be provided which pictorially retains the rear end of the vehicle together with its license number, whereby at the same time the instrumentation scale and, if desired, further information can be superimposed upon the photographic picture. Since with the described apparatus the actual measuring and recording process is extensively automated, such that the operator can direct his attention to the traffic conditions, it is of course also desirable that an automatic actuation or tripping of the camera occur.

However, the automatic tripping or activation of the camera is associated with considerable difficulties, particularly if one considers that, on the one hand, the rear end of the vehicle together with the license plate must always be retained approximately at the same location in the center of the photographic print and, on the other hand, however, the vehicles move with quite different speeds or velocities, and further, that the length of the vehicles is completely different from case to case, depending upon whether one is concerned with a light or passenger car or with a motor-lorry having a trailer. Initially, one could conceive of selecting the viewing or image angle of the camera to be of sufficiently large magnitude, yet such does not provide a satisfactory solution to the problem since then the numbers of the license plate appear too small, so that they can no longer be read without difficulty and error.

A primary object of the present invention is to effectively and reliably solve the aforementioned problem.

Another important object of the present invention is to provide an improved method for activating a photographic camera associated with a radar speed measuring apparatus wherein the camera is activated as a function of the speed of movement of the object to be photographed and speed-checked.

A further important object of the present invention is the provision of an improved method for the tripping of a photographic camera associated with a speed-checking apparatus for road vehicles ensuring for activation of the camera at the proper instance of time when the rear end of the vehicle passes through the operating zone of the camera, so that the photographed picture of the vehicle permits of clear and quick observation and determination of the license number of such vehicle together with any other pertinent information which can be read-off the aforesaid photograph.

Still a further important object of this invention is to provide a new and improved method of activating a photographic camera operating in conjunction with radar speed recording apparatus for vehicles wherein activation of the camera is made dependent upon the speed of movement of the vehicle to be photographed and is delayed for a time span inversely proportional to such vehicle speed, in order to take into consideration the time necessary for the vehicle rear end upon leaving the radar beam to travel into the operating or viewing zone of the camera such that the camera will then be actuated when such rear vehicle end is properly disposed for photographing thereof.

The method of the present invention for automatically activating or tripping the recording camera is characterized by the steps that, the camera is fixedly adjusted in a direction which is cut or traversed by the vehicle first then after the latter has departed from the radar beam, and that, measured from the period of time in which the end of the vehicle leaves the radar beam, the camera activation is delayed for a time span which is inversely proportional to the measured vehicle speed and corresponds to the time necessary to drive from the aforementioned period of time up to passage of the end of the vehicle through the direction or operating range of the camera.

The inventive method will now be described, by way of example and not limitation, with respect to the single figure appearing in the drawing in which the determinative geometric relationships upon the roadway are diagrammatically illustrated.

Referring now to the drawing, reference numeral 1 denotes the direction of travel of the object or vehicle in the center of the traffic lane between the road edge 2 and the dividing line 3 (road center-line). The radar antenna 4 is erected at the edge of the roadway 2 and transmits a radar beam 5 at an acute angle, for example 24° with respect to the direction of travel 1 of the vehicle. The angle of divergence of the radar beam or package 5 is for example 10°, so that the point of entry of the vehicle into the radar beam 5 occurs at the location $a$ and the point of departure from the beam at the location $b$. The recording camera 10 is also operably secured to the radar antenna housing 4 and is so aligned that its operating zone or optical axis 11 intersects or cuts the direction of travel 1 at the location $c$, which location will only then be passed by the vehicle after such has departed from the radar beam 5.

After a vehicle has entered the radar beam 5 at the location $a$, the vehicle speed is determined by utilizing the Doppler effect and there is built-up in the speed recording apparatus an electric level or signal which is proportional to the vehicle speed, in the manner for example clearly described in my aforementioned copending application, now United States Patent 3,137,538. Thereafter, and for such time as the vehicle is still located in the radar beam 5, there is automatically determined at the speed measuring apparatus whether a recording of the vehicle speed should take place, that is, whether the speed of the vehicle exceeds a preset upper limit or critical value. The measured speed value is also during a specific time, after the vehicle has again already passed the radar beam 5, stored in the apparatus and retained by the indicating instrument.

At the moment of time that the end of the vehicle leaves the radar beam 5 at the location $b$ the Doppler signal upon which the speed calculation is based and which is reflected back to the antenna 4 disappears. This is the criterion for the beginning of a time-delay, upon the expiration of which the camera is to be tripped or actuated by the speed recording apparatus. This time-delay is now, however, variably calculated in the apparatus while taking into consideration the measured vehicle speed, and, indeed, such that it is inversely proportional to the measured electrical level or signal. Circuits for delaying a device, a camera for instance, as a function of an input signal, wherein the time delay depends upon the amplitude of such input signal are already known to the art. For instance, a circuit suitable for this purpose is disclosed in Figure 8, at page 679, of an article by J. S. Riordon, appearing in the October 1962 issue of Electronic Engineering, and entitled "A Linear Voltage-Controlled Transistor Time Delay Circuit." In this manner there is taken into consideration the fact that, the constant path between points *b* and *c* will be passed by the various vehicles in different times, depending upon whether the relevent vehicle is travelling quickly or slowly. In this manner there is also achieved the result that the time-delay for the camera activation always corresponds to the driving time from point *b* to point *c* and the end of the vehicle is always photographed upon passing the location *c*, independent of the vehicle length and its speed.

The foregoing detailed description has been given for clearness of understanding only, and no unnecessary limitations should be understood therefrom, as modifications will be obvious to those skilled in the art.

Having thus described the present invention, what is desired to be secured by United States Letters Patent, is:

1. In the art of checking the speed of moving objects, particularly road vehicles, by means of a radar speed measuring apparatus which transmits a radar beam, with such apparatus having a camera associated therewith for photographing the vehicle to be speed-checked, the method of activating such camera, which comprises the steps of: positioning the camera such that the operating zone thereof is first traversed by the vehicle to be speed-checked after the latter has moved out of the radar beam, and delaying the activation of the camera as a function of the determined speed of movement of the vehicle.

2. In the art of checking the speed of moving objects, particularly road vehicles, by means of a radar speed measuring apparatus which transmits a radar beam, with such apparatus having a camera associated therewith for photographing the vehicle to be speed-checked, the method of activating such camera, which comprises the steps of: positioning the camera such that the operating zone thereof is first traversed by the vehicle to be speed-checked after the latter has moved out of the radar beam, and delaying the activation of the camera inversely proportional to the determined speed of movement of the vehicle.

3. In the art of check the speed of moving objects, particularly road vehicles, by means of a radar speed measuring and recording apparatus which transmits a radar beam, with such apparatus having a recording camera associated therewith for photographing the vehicle to be speed-checked, the method of activating such recording camera, which comprises the steps of: positioning the recording camera such that the operating zone thereof is first traversed by the vehicle to be speed-checked after the latter has moved out of the radar beam, and delaying the activation of the camera for a time span measured from the time that the rear end of the vehicle to be speed-checked moves out of the radar beam and which is inversely proportional to the determined speed of movement of such vehicle, with such time span corresponding to the period of time necessary for the rear end of the vehicle to travel from the location at which such rear vehicle end moves out of the radar beam and passes through the operating zone of the recording camera.

No references cited.

CHESTER L. JUSTUS, *Primary Examiner.*

R. D. BENNETT, *Assistant Examiner.*